US006866779B1

United States Patent
Burke

(10) Patent No.: US 6,866,779 B1
(45) Date of Patent: Mar. 15, 2005

(54) NITROGEN RECOVERY SYSTEM AND METHOD

(75) Inventor: Dennis A. Burke, Olympia, WA (US)

(73) Assignee: Western Environmental Engineering Company, Olympia, WA (US)

(*) Notice: Subject to any disclaimer, the term of this patent is extended or adjusted under 35 U.S.C. 154(b) by 2 days.

(21) Appl. No.: 10/625,198

(22) Filed: Jul. 22, 2003

Related U.S. Application Data

(60) Provisional application No. 60/398,296, filed on Jul. 22, 2002.

(51) Int. Cl.[7] .............................. C02F 3/28; C05F 3/00
(52) U.S. Cl. ..................... 210/603; 210/631; 210/903; 423/237; 71/10
(58) Field of Search ................. 210/601, 603, 210/605, 630, 631, 903; 423/237; 71/10; 95/241, 245, 254

(56) References Cited

U.S. PATENT DOCUMENTS

| | | | |
|---|---|---|---|
| 3,642,618 A | | 2/1972 | Silva |
| 4,076,515 A | * | 2/1978 | Rickard .......................... 71/10 |
| 4,267,050 A | | 5/1981 | Conway et al. |
| 4,510,057 A | * | 4/1985 | Rowe et al. ................. 210/612 |
| 4,790,944 A | | 12/1988 | Gordon et al. |
| 4,894,162 A | | 1/1990 | Cournoyer et al. |
| 4,900,452 A | | 2/1990 | Angles et al. |
| 4,959,084 A | | 9/1990 | Wolverton et al. |
| 5,015,384 A | | 5/1991 | Burke |
| 5,053,140 A | | 10/1991 | Hurst |
| 5,310,485 A | | 5/1994 | Roshanravan |
| 5,397,461 A | | 3/1995 | Augustin |
| 5,670,047 A | | 9/1997 | Burke |
| 5,702,612 A | | 12/1997 | Wang |
| 5,858,768 A | | 1/1999 | Bonnin et al. |
| 5,891,711 A | | 4/1999 | Carter |
| 5,900,159 A | | 5/1999 | Engel et al. |
| 5,670,047 A | | 9/1999 | Burke |
| 6,113,786 A | | 9/2000 | Burke |
| 6,113,789 A | | 9/2000 | Burke |
| 6,299,774 B1 | * | 10/2001 | Ainsworth et al. ......... 210/603 |
| 6,309,547 B1 | | 10/2001 | Burke |
| 6,464,875 B1 | * | 10/2002 | Woodruff ..................... 210/603 |
| 6,500,340 B1 | | 12/2002 | Burke |
| 6,569,332 B2 | * | 5/2003 | Ainsworth et al. ......... 210/603 |
| 6,616,844 B2 | * | 9/2003 | Park et al. ................... 210/605 |
| 2003/0052061 A1 | | 3/2003 | Burke |
| 2003/0141244 A1 | | 7/2003 | Hansen et al. |

FOREIGN PATENT DOCUMENTS

JP          6-71293 A   *   3/1994

OTHER PUBLICATIONS

"Ammonia Stripping," *Wastewater Technology Fact Sheet*, U.S. Environmental Protection Agency, Washington, DC, Sep. 2000, 4 pages.

"Beginner's Guide To Nitrification/Denitrification Technologies," <http://www.envstudies.brown.edu/Thesis/2002/caton/WWTFpages/WWTFgeneral.htm> [retieved 2003], 4 pp.

"Biological Treatment of Gases (Biofilter)," n.d., <http://www.res.titech.ac.jp/~junkan/english/deodorize/> [retrieved Jul. 16, 2003], pp. 1–3.

(List continued on next page.)

*Primary Examiner*—Fred G. Prince
(74) *Attorney, Agent, or Firm*—Christensen O'Connor Johnson Kindness PLLC

(57) ABSTRACT

A process for the recovery of nitrogen from anaerobically digested liquid waste and for the collection of the nitrogen as nitrate compounds that can be used to produce fertilizer and compost, includes stripping ammonia from anaerobically digested liquid waste, and converting the ammonia into nitrates via nitrification.

25 Claims, 1 Drawing Sheet

OTHER PUBLICATIONS

Burke, D.A., *Dairy Waste Anaerobic Digestion Handbook: Options for Recovering Beneficial Products From Dairy Manure*, Environmental Energy Company, Olympia, Wash., Jun. 2001, 54 pages.

Crawford, H.B., and R.J. Kepler (eds.), *Chemical Engineers' Handbook*, 5th ed., McGraw–Hill, New York, 1973, Chap. 14, "Gas Absorption," pp. 2–16.

Crawford, H.B., and R.J. Kepler (eds.), *Chemical Engineers' Handbook*, 5th ed., McGraw–Hill, New York, 1973, Chap. 19, "Gravity Sedimentation Operations," pp. 44–106.

Heitner, H.I., "Flocculating Agents," *Kirk–Othmer Concise Encyclopedia of Chemical Technology*, 4th ed., John Wiley & Sons, New York, 1999, pp. 869–871.

Joshi, J.A., et al., "Gaseous Ammonia Removal in Biofilters: Effect of Biofilter Media on Products of Nitrification," Department of Environmental Sciences, Rutgers, State University of New Jersey, at least as early as Jun. 1998, 11 pages.

Nicolai, R.E., et al., "Biofilter Demonstration Project: Final Report," Biosystems and Agricultural Engineering Department, University of Minnesota, Aug. 13, 1999, 9 pages.

Nicolai, R.E., "Biofilter Design Information: BAEU–18," *Biosystems and Agricultural Engineering Department, University of Minnesota Extension Program*, Jun. 1998, <http://www.bae.umn.edu/extens/aeu/baeu18.html> [retrieved Dec. 18, 2001], 10 pages.

Nicolai, R.E., et al., "Demonstration Biofilter on Dairy and Swine Facilities," *Biosystems and Agricultural Engineering Department, University of Minnesota, 2000 Annual Report*, Feb. 27, 2001 <http://www.bae.umn.edu/annrpt/2000/research/livestock13.html> [retrieved Dec. 18, 2001], 10 pages.

Sadowsky, M., et al., "Final Project Report—Biofilter Microbes," University of Minnesota, Aug. 8, 1999, 15 pages.

Schmidt, D., et al., "Biofilters for Odor Control," University of Minnesota Extension Service, 2000, 2 pp.

"Waste Processing and Resource Recovery (WP&RR)," *New Jersey—NASA Specialized Center of Research and Training for Bioregenerative Life Support Monthly Report*, Jul. 30, 1998, <http://nj–nscort.rutgers.edu/visitor/rnews/njnscort/Njn–0798.html>[retrieved Dec. 18, 2001], 3 pages.

Yarar, B., "Flotation," *Kirk–Othmer Concise Encyclopedia of Chemical Technology*, 4th ed., John Wiley & Sons, New York, 1999, pp. 871–872.

* cited by examiner

NITROGEN RECOVERY SYSTEM AND METHOD

CROSS-REFERENCE TO RELATED APPLICATION

This application claims the benefit of U.S. Provisional Application No. 60/398,296, filed on Jul. 22, 2002, incorporated herein by reference in its entirety.

FIELD OF THE INVENTION

The field of the invention is related to the removal and recovery of nitrogen from anaerobically digested liquid waste and the collection of the nitrogen as nitrates and organic nitrogen compounds that can be used to produce fertilizer and compost.

BACKGROUND OF THE INVENTION

The presence of nitrogenous compounds in wastewater liquids poses many environmental problems. Storage and degradation of wastewater containing protein or amino acids result in the formation of ammonia. Ammonia can be released into streams and rivers and thereby threaten aquatic life. Ammonia gas may also be discharged to the atmosphere from holding ponds or treatment facilities, resulting in environmental and public health concerns. Atmospheric ammonia forms small aerosol particles that have been linked to significant public health problems.

Normally, ammonia is removed from water through aerobic processes, such as nitrification followed by denitrification. Nitrification and denitrification can remove a very high percentage of the ammonia. Through such processes, ammonia is returned to the atmosphere as nitrogen gas. However, the nitrification and denitrification processes produce nitrous oxide, a greenhouse gas.

The processes of denitrification also results in a lost opportunity to recover nitrogen that can be used as compost or fertilizer. Typically, ammonia fertilizer is made through the combustion of natural gas with air, which is known as the Haber process. Creation of ammonia fertilizer via this route is expensive, and produces carbon dioxide. Carbon dioxide is also a greenhouse gas.

An alternative process that recovers a portion of the nitrogen from waste liquids is desirable from both an economic and an environmental standpoint.

SUMMARY OF THE INVENTION

The present invention is related to a process for the recovery of nitrogen from wastewater liquids, and collection and sequestration of the nitrogen in organic matter taking the form of nitrate and organic nitrogen compounds. Recovered nitrate and organic nitrogen compounds can be used to produce nitrogen-rich organic compost fertilizer. One embodiment of the method according to the invention can recover nitrogen from liquid waste to produce nitrogen-rich fertilizer. The process produces less greenhouse gases as compared with the typical nitrification and denitrification processes. Such reduction in ammonia levels and greenhouse gases is thought to produce beneficial health benefits for people and lessen the environmental impact.

In one embodiment of the present invention, a method for recovering nitrogen from liquid waste is provided. The method includes anaerobically digesting liquid waste in an anaerobic digester. Through this process, digested liquid waste is produced containing amounts of dissolved carbon dioxide and ammonia. Dissolved ammonia can exist in liquid as ammonium ions. The digested liquid waste can be stripped of carbon dioxide with a gas, such as air. Upon stripping the carbon dioxide, the ammonium ions form ammonia gas and are likewise stripped from the digested liquid waste. The gases leaving the stripping unit can be fed to a biofilter containing bacteria that convert the stripped ammonia into nitrate compounds and bacterial biomass, for example.

In another embodiment of the invention, a further step of the method includes separating solids from the digested liquid waste prior to stripping ammonia from the digested liquid waste.

In other embodiments, the temperature of the digested liquid waste can be raised prior to or during stripping to facilitate the stripping of ammonia. In other embodiments, the pH of the digested liquid waste can be raised by adding alkalinity to the digested liquid waste to facilitate stripping of the ammonia.

The stripped ammonia can be converted into nitrate, or other nitrogenous compounds, suitable to use as fertilizer and compost, for example.

BRIEF DESCRIPTION OF THE DRAWINGS

The foregoing aspects and many of the attendant advantages of this invention will become more readily appreciated by reference to the following detailed description, when taken in conjunction with the accompanying drawing, wherein.

DETAILED DESCRIPTION OF THE PREFERRED EMBODIMENT

Figure 1:
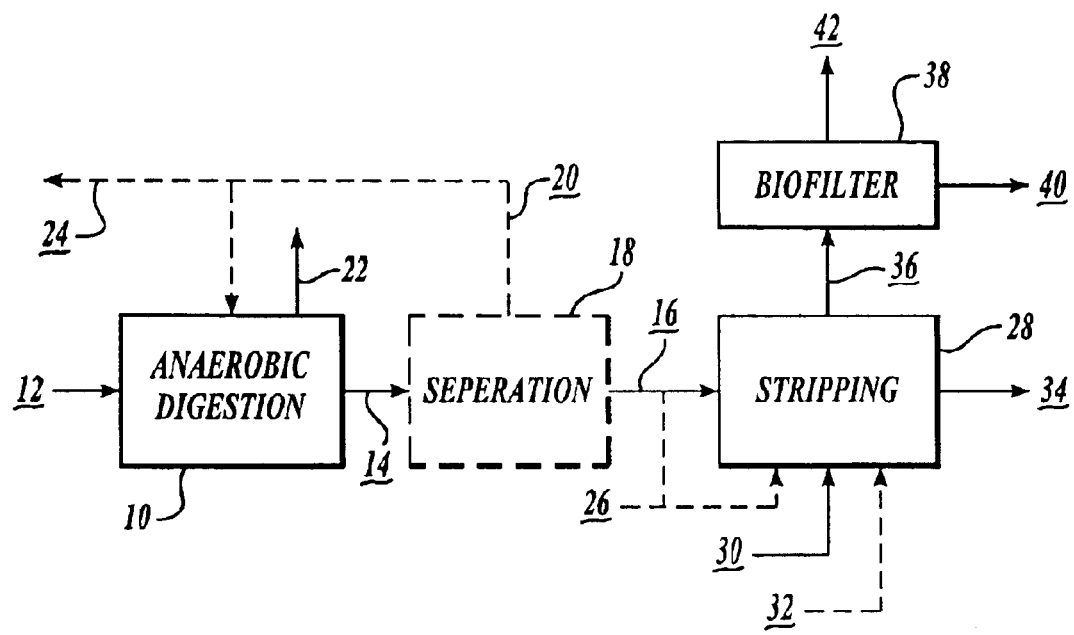
FIG. 1 is a schematic illustration of one embodiment of a method according to the present invention.

FIG. 1 schematically illustrates one embodiment of a method according to the present invention. Anaerobically digesting liquid waste 10, such as flush water containing cow manure from dairy farms, is followed by gas stripping or desorption 28 of dissolved carbon dioxide and ammonia from the digested liquid. The stripped gases are treated in a bacteria-activated "biofilter" 38, that converts ammonia into nitrate compounds and other nitrogenous compounds that can then be used as fertilizer. The method according to the invention combines the processes of anaerobic digestion, desorption, and nitrification to advantageously recover nitrogen, which would otherwise be discharged into the atmosphere.

The system to carry out the method according to the present invention, includes an anaerobic digester 10, a gas desorption or stripping unit 28, a nitrification unit or biofilter 38, and optionally a solids separator 18. It is to be appreciated that the FIGURE represents a portion of what may be a larger integrated system. For example, the influent liquid waste 12 may have undergone pretreatment before arriving at the anaerobic digester 10, such as by being processed through several screens and sedimentation, or holding ponds. However, pretreatment of the waste in this manner may also potentially reduce the amount of solids that can be converted into valuable products. These predigester unit operations are described in DAIRY WASTE ANAEROBIC DIGESTION HANDBOOK, by Dennis A. Burke (2001), incorporated herein by reference in its entirety. The HANDBOOK is available on the Internet at www.makingenergy.com. The system according to the invention may be integrated into existing dairy farms to recover the nitrogen that is otherwise lost into the atmosphere through the conventional process of treating water generated by dairy operations.

According to the invention, the anaerobic digester 10 digests the influent liquid waste stream 12. The influent liquid waste 12 can include, but is not limited to, water, collected during the typical operation of a dairy farm. Anaerobic digestion 10 produces digested liquid waste 14 through the breakdown of organic material via a microbial population that lives in the oxygen-free environment in the digester 10. When organic matter decomposes in an anaerobic environment, the bacteria produce, at a minimum, methane and carbon dioxide gas. Nitrogen-containing compounds are converted to ammonia, and sulfur-containing compounds are converted into hydrogen sulfide. In the system according to the invention, these gases can be vented from the digester 10 via vent line 22. Some gases are soluble and can remain dissolved within the liquid. Methane gas can be used as an energy source. The digested liquid waste 14, leaving the digester 10, includes water, soluble organic and inorganic compounds, such as soluble gases, and insoluble organic and inorganic compounds. Reference is again made to the DAIRY WASTE ANAEROBIC DIGESTION HANDBOOK for a more detailed description of anaerobic digestion. In particular, representative examples of suitable anaerobic digesters for use in one embodiment of the method according to the present invention are described therein, including, but not limited to, covered anaerobic lagoons, plug flow digesters, mesophilic completely mixed digesters, thermophilic completely mixed digesters, anaerobic contact digesters, and hybrid contact/fixed film reactors, and the like. Such digesters are at least suitable for processing dairy waste. Other anaerobic digesters include packed fixed film reactors, upflow anaerobic sludge blanket reactors (UASB), and horizontal baffled reactors, described also in the HANDBOOK.

After anaerobic digestion 10, the liquid waste 12 contains carbon dioxide, ammonia, and other dissolved inorganic components, such as alkaline compounds. Typically, the majority of ammonia remains dissolved in digested waste liquid 14, as the ammonium ion. The pH of digested liquid waste 14 can be between about 7 and about 8. The anaerobic digestion process also produces carbon dioxide that dissolves in the digested liquid waste 14. The amount of dissolved carbon dioxide is a function of at least the partial pressure of carbon dioxide, which is typically between about 25% to bout 40% of the total pressure within the anaerobic digester 10. In accordance with the resent invention, the anaerobic digestion process can be used to produce a digested iquid product, which has a substantial amount of carbon dioxide and ammonia dissolved therein. The anaerobic digestion process also uses heat through the thermophilic or mesophilic digestion of the liquid waste influent 12. Since the subsequent process of ammonia stripping is both temperature and pH dependent, higher digestion temperatures and pH values in the anaerobic digester 10 are advantageous in the stripping process to recover ammonia.

In one embodiment of the present invention, a liquid/solid separator 18 can be provided after anaerobic digestion 10. The separator 18 is an optional piece of equipment. Separation is optional, according to one embodiment of the invention. Digested liquid waste 14 includes a solid phase and a liquid phase. The separator 18 is provided to separate the solid phase from the liquid phase. The separated solid phase 20 can be recycled to the anaerobic digestion process 10. Additionally, or alternatively, the separated solid phase 20 can be diverted to other operations, which process the solid phase into compost or other beneficial products 24, or alternatively used in biofilter 38. The solid phase will contain some nitrogen compounds and the majority of the phosphorus. Digested liquid waste having reduced solids is represented by reference numeral 16. Representative separators 18 include filters, screens, screw presses, flotation and gravity separators. A suitable flotation separator is described in U.S. application Ser. No. 10/194,451, filed Jul. 11, 2002, incorporated herein by reference in its entirety. Solid-phase separation methods and units are explained in many engineering textbooks, such as the CHEMICAL ENGINEERS' HANDBOOK, 5th ed., by Perry and Chilton, incorporated herein in its entirety by reference. A stripping unit 28 to recover ammonia follows the separator 18 or, if no separator 18 is provided, the anaerobic digester 10.

According to the present invention, digested liquid waste, containing solids 14 or reduced solids 16, is stripped of at least some ammonia in a stripping unit 28. As used herein, digested liquid waste can refer to digested liquid waste containing solids 14, or digested liquid waste with reduced solids 16 if the optional separator 18 is used prior to stripping 28. The stripping unit 28 receives digested liquid waste 14 or 16, containing at a minimum dissolved carbon dioxide and dissolved ammonia. Carbon dioxide and ammonia (acting as the sorbate) can be stripped from the liquid by contact with a stripping gas 30 (acting as the sorbent) through a process known as desorption. The stripping gas 30 contains comparatively lower amounts of carbon dioxide and ammonia as compared with the digested liquid waste 14 or 16, so as to provide a concentration gradient that will cause the diffusion of the carbon dioxide and ammonia from the digested liquid waste 14 or 16 into the stripping gas 30. It is to be appreciated that molecular diffusion is but one process that can be occurring to cause the carbon dioxide and ammonia to transfer into the stripping gas 30. In one embodiment, the stripping gas can be air. As desorption of carbon dioxide takes place, the pH of the digested liquid waste 14 or 16 may increase due to the removal of the carbon dioxide. As the pH of the digested liquid waste increases, some of the ionized ammonia (ammonium ions) will be converted into gaseous ammonia. A portion of this ammonia may be stripped in conjunction with the carbon dioxide. Eventually, the carbon dioxide concentration of the digested liquid waste 14 or 16 will be reduced, such that the concentration of carbon dioxide approaches equilibrium with the concentration of the carbon dioxide of the stripping gas 30. At this point, the pH of the digested liquid waste 14 or 16 can be between about 8 to about 9. At this pH, the ammonium ions tend to form into ammonia and are removed by the stripping gas. As the gaseous ammonia is removed, ammonium ions continue to be converted to gaseous ammonia. The fundamentals of desorption or stripping is explained in many engineering books, such as the CHEMICAL ENGINEERS' HANDBOOK, 5th ed., by Perry and Chilton, pp. 14–2 to 14-16, incorporated herein by reference, in its entirety. Typically, packed towers or plate towers are used to carry out gas desorption from liquids, each type of tower having its advantages and disadvantages, depending on the ultimate application. The engineering literature has fuller descriptions of suitable stripping towers. For example, reference is made to the United States Environmental Protection Agency Paper, EPA 832-F-00-019 (September 2000), incorporated herein by reference in its entirety.

As an alternative embodiment, caustic, or alkaline chemicals 26, may be added to the digested liquid waste 14 or 16, to assist in the stripping of ammonia from the liquid. As shown in the FIGURE, alkalinity can be added to the digested liquid waste 14 or 16 either before the stripping unit 28 or to the stripping unit 28. The amount of alkalinity can be varied. A suitable amount of alkalinity to add can be obtained by balancing the consumption of energy required in the stripping process and the cost of alkaline chemical addition. A suitable alkaline compound can be sodium or calcium hydroxide, and the like. Magnesium hydroxide or magnesium oxide can also be added, in this case, before or after anaerobic digestion.

As another alternative embodiment, the temperature of the digested liquid waste 14 or 16 can be increased. Increasing the temperature of the digested liquid waste 14 or 16 will result in an increased rate of stripping the ammonia from the liquid. A heat exchanger can be provided in the line to the stripping unit 28 or, additionally or alternatively, the stripping unit can be provided with a jacket surrounding the stripping vessel and so provide for heat exchange between a comparatively hot fluid and the digested liquid waste 14 or 16. Heat-providing media 32, such as steam, or other condensable fluids, or hot liquids, can be introduced directly, or alternatively, on the shell or tube side of a heat exchanger or the jacket of the stripping vessel 28. The temperature of the digested waste liquid 14 or 16 may be varied according to the desired amount of stripping performance. The system can readily be provided with heat transfer equipment to provide heat, in addition to the heat that is produced during anaerobic digestion.

Increasing the pH of the digested liquid waste 14 or 16 by introducing alkalinity to the digested liquid waste 14 or 16, either before the stripping unit 28 or in the stripping unit 28, and raising the temperature of the digested liquid waste 14 or 16, is believed to increase the rate at which ammonia can be stripped from the digested liquid waste 14 or 16. The stripping unit 28 can produce a stripped liquid-phase component 34 having reduced quantities of soluble compounds and a gas-phase component 36 containing the soluble compounds.

The stripped liquid waste 34 is discharged from the stripping unit 28 and may be processed further. Stripped gas 36 from the stripping unit 28, contains, at a minimum, ammonia. A nitrification biofilter 38, located downstream of the stripping unit 28, can be used to convert the ammonia that is stripped from the digested liquid waste 14 or 16 into nitrogenous compounds, other than ammonia, by bacterial activity. Nitrate compounds are the result of a process referred to as nitrification. The literature is replete with descriptions of the nitrification process that oxidizes ammonia into nitrite by Nitrosomonas bacteria, and from nitrite to nitrate by Nitrobacter bacteria. The nitrate compounds 40 can be collected, and further processed, and/or refined into desirable products, such as nitrogen-rich compost, or fertilizer. The gas-phase component 42 can be discharged from the biofilter 38.

A nitrification biofilter 38 according to the invention may include a fibrous material, such as compost or a synthetic porous media capable of supporting a bacterial consortium for the conversion of ammonia to nitrate compounds and organic biomass containing nitrogen. The biofilter 38 can have sufficient nutrient value to support the bacterial consortia. Additionally or alternatively, nutrients and micronutrients may be added to ensure adequate bacterial performance. Moisture may also be added, if sufficient moisture is not present in the gas 36 from the stripping unit 28. The quantity of moisture present in the gas 36 may be a function of the temperature at which the digestion and stripping phases are carried out. According to the present invention, the biofilter can support a bacterial consortia that will absorb and precipitate the ammonia gas into nitrate compounds and/or organic biomass containing nitrogen. Depending on the type of biofilter used, the biofilter media 40 can be replaced from time to time with new media. During the replacement of the biofilter media, the newer media may be seeded with bacterial consortia of the previous filter media. The filter media that are removed will be substantially higher in nitrogen compounds than the original filter media.

Biofilters are presently being used to eliminate odors from buildings, such as barns, by venting the barn air through a bed of organic material. As the air passes through the organic medium, microorganisms convert the organic gases into carbon dioxide and water. Literature on biofiltration regarding the recovery of nitrogen from ammonia is also available. For example, reference is made to the articles, "Biofilters for Odor Control," D. Schmidt, et al., University of Minnesota; and "Gaseous Ammonia Removal in Biofilters: Effect of Biofilter Media on Products of Nitrification," J. A. Joshi et al., Rutgers, The State University of New Jersey, both incorporated herein by reference in their entirety.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for recovering nitrogen from liquid waste, comprising:

(a) anaerobically digesting liquid waste into digested liquid waste containing ammonia;

(b) stripping said ammonia from said digested liquid waste to produce gas containing ammonia; and (c) converting said stripped ammonia in said gas into nitrate compounds via nitrification.

2. The method of claim 1, further comprising separating solids from the digested liquid waste prior to stripping.

3. The method of claim 2, wherein the separated solids are recycled to anaerobic digestion.

4. The method of claim 1, further comprising raising the pH of the digested liquid waste.

5. The method of claim 1, further comprising raising the temperature of the digested liquid waste.

6. The method of claim 1, wherein ammonia is stripped by contacting the digested liquid waste with air.

7. The method of claim 1, further comprising collecting organic biomass containing nitrogen.

8. The method of claim 1, wherein the pH of the digested liquid waste is about 7 to about 8.

9. The method of claim 1, wherein the pH of the digested liquid waste is about 8 to about 9.

10. A method for recovering nitrogen from anaerobically digested liquid waste, comprising:

(a) stripping ammonia from anaerobically digested liquid waste to produce gas containing ammonia; and (b) converting said stripped ammonia in said gas into nitrate compounds via nitrification.

11. The method of claim 10, further comprising raising the pH of the digested liquid waste.

12. The method of claim 10, further comprising raising the temperature of the digested liquid waste.

13. The method of claim 10, wherein ammonia is stripped by contacting the digested liquid waste with air.

14. The method of claim 10, further comprising collecting organic biomass containing nitrogen.

15. The method of claim 10, wherein the pH of the digested liquid waste is about 7 to about 8.

16. The method of claim 10, wherein the pH of the digested liquid waste is about 8 to about 9.

17. A method for making fertilizer from liquid waste containing manure, comprising:
- (a) anaerobically digesting liquid waste containing manure into digested liquid waste containing ammonia;
- (b) stripping said ammonia from said digested liquid waste to produce gas containing ammonia; and
- (c) converting said stripped ammonia in said gas into nitrate compounds via nitrification.

18. The method of claim 17, further comprising separating solids from the digested liquid waste prior to stripping.

19. The method of claim 17, further comprising raising the pH of the digested liquid waste.

20. The method of claim 17, further comprising raising the temperature of the digested liquid waste.

21. The method of claim 17, wherein ammonia is stripped by contacting the digested liquid waste with air.

22. The method of claim 17, further comprising collecting organic biomass containing nitrogen.

23. The method of claim 17, wherein the pH of the digested liquid waste is about 7 to about 8.

24. The method of claim 17, wherein the pH of the digested liquid waste is about 8 to about 9.

25. The method of claim 17, wherein the separated solids are recycled to anaerobic digestion.

* * * * *